G. F. VAN METER.
LOCKING MEANS FOR CASTER PINTLES.
APPLICATION FILED SEPT. 12, 1921.
1,423,700.   Patented July 25, 1922.
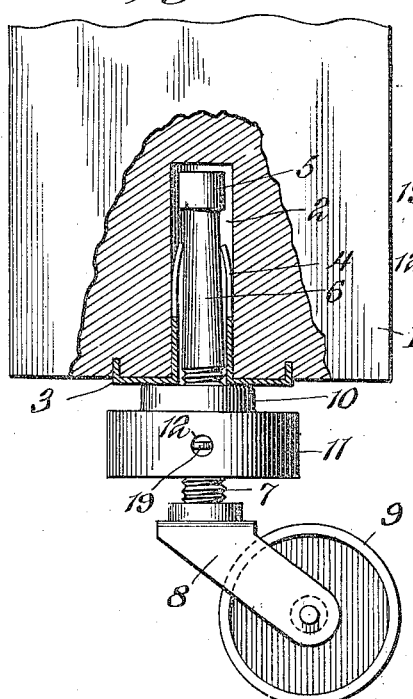
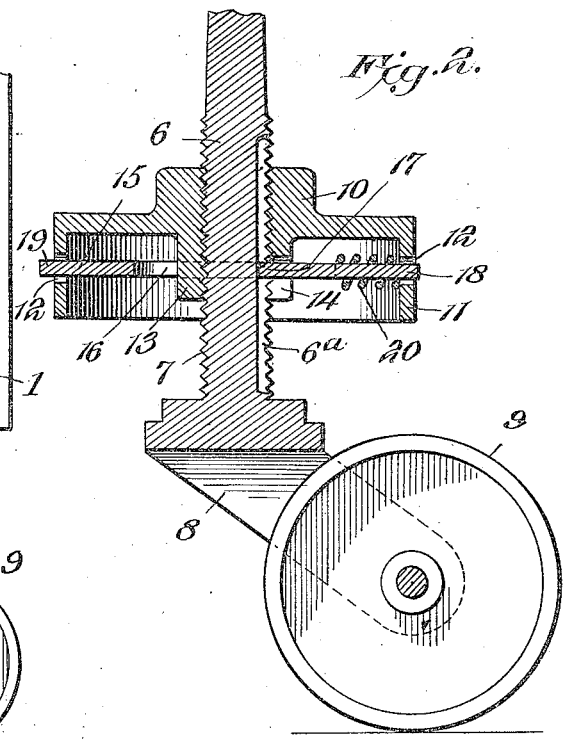
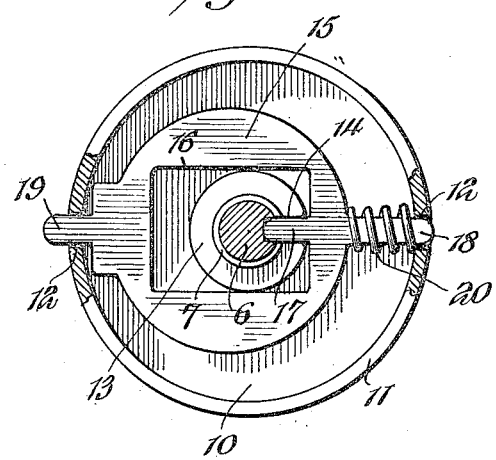
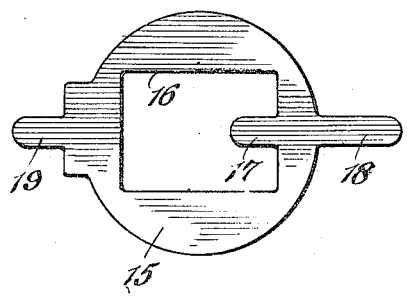
George F. Van Meter,
INVENTOR,
BY *James J. Whitley Co.*
ATTORNEYS

UNITED STATES PATENT OFFICE.

GEORGE F. VAN METER, OF INDIANAPOLIS, INDIANA, ASSIGNOR TO UNITED STATES CASTER CO., INCORPORATED, OF INDIANAPOLIS, INDIANA.

LOCKING MEANS FOR CASTER PINTLES.

1,423,700.  Specification of Letters Patent.  Patented July 25, 1922.

Application filed September 12, 1921. Serial No. 500,087.

*To all whom it may concern:*

Be it known that I, GEORGE F. VAN METER, a citizen of the United States, residing at Indianapolis, in the county of Marion and State of Indiana, have invented new and useful Improvements in Locking Means for Caster Pintles, of which the following is a specification.

My present invention pertains to casters, and it contemplates the provision of casters for furniture, phonograph cabinets, and the like, through the medium of which the furniture or the article to which the caster is secured may be readily, quickly and easily raised or lowered and this with but a slight amount of work on the part of the person using the invention.

The invention further contemplates a caster that is strong and durable in construction and one that will materially add rather than detract from the finished appearance of a piece of furniture.

The invention in all of its details will be fully understood from the following description and claim, when the same are read in connection with the drawings, accompanying and forming part of this specification, in which:

Figure 1 is a side elevation of my novel caster as the same appears as applied to an article of furniture.

Figure 2 is a longitudinal sectional view of the caster per se.

Figure 3 is an inverted plan view of the nut and locking member of my novel caster.

Figure 4 is a detailed view of the locking element of the caster.

Similar numerals of reference designate corresponding parts in all of the views of the drawings.

My novel caster is secured in the leg portion 1 of an article of furniture or any other element having the slot or channel 2 and the spring socket 3, through the medium of which the caster is prevented from becoming casually displaced from the slot or opening 2. The elements above referred to are not of the essence of my invention and any other means, therefore may be employed to retain the shank of the caster in the furniture that may suggest itself in the future practice of the invention.

My novel caster comprises the shank 6, having the head 5 that enters the slot or opening 2 of the furniture and is retained therein by means of the spring socket 3 having the upper inwardly bent spring portions 4. In practice the shank is forced into the socket 3 and the head 5 thereof pushed past the spring portions 4, and hence casual displacement of the shank is precluded.

The shank 6 is provided with a longitudinal key-way or channel 6ª and said shank may be provided with a series of such key-ways 6ª if desired without departure from the scope of this invention, and the said shank is threaded as indicated by 7, and the said key-way is provided longitudinally in the threaded portion of the shank as illustrated.

At its lower end the shank is provided with the well known hanger 8 and the further well-known roller or bearing wheel 9. These latter elements may be of any shape or construction and as before stated form no part of this invention.

The nut 10 is threaded to engage the threads of the shank 7, and said nut is provided with an upper bearing surface that rests at all times on the lower end of the spring socket 3. However, were a socket not used, the said bearing portion of the nut would rest on the lower end of the leg or other lower element of the furniture to which the device is applied.

The said bearing or nut 10 is provided with the cup-shaped portion or element 11 that in turn is provided with apertures 12 and at its inner surface the bearing 10 is provided with a shank or flange 13 and in said flange 13 I provide a slot or channel 14 that receives the projection 17 of the locking element 15.

This element 15 is of the construction illustrated in Figure 4 and comprises the practically square inner portion 16 and on one end the element 15 is provided with a projection 19 and on its directly opposite end the element 15 is provided with the comparatively large projection 18. The elements or projections 18 and 19 are retained in the apertures or openings 12 and the projection 17 is adapted to be normally retained in the channel 6ª of the shank 6 by means of a spring 20 that surrounds the projection 18 and bears against the inner wall of the cup-shaped portion 11 and at its opposite end abuts against the outer surface of the locking element 15.

In the practical use of the invention, the user of my device, when it is desired to raise or lower the leg of an article of furniture equipped with my device, merely presses the projection 19 inwardly against the action of the spring 20 and holds it in said position while he manipulates the bearing 10 either to the right or the left. Manifestly this may easily be accomplished with the right hand, while holding the hanger portion of the shank in the left hand to prevent it from turning and thus defeat the purpose of my device.

Manifestly it is a very simple matter to raise a large or small piece of furniture notwithstanding the size or strength of those practicing the device, and when the desired height of the furniture is reached, it is simply necessary to release the finger from the projection 19 and continue to turn the bearing until the projection 17 slides into the channel or slot of the shank 6 where it will be held in a rigid manner by action of the spring 20.

It will be manifest that the invention is simple in construction and inexpensive to produce, and contains no delicate parts such as are liable to become inoperative after a short period of use.

It will further be manifest from the foregoing in connection with the drawings, that the locking element does not have to be riveted to the shank of the caster as the apertures in the cup-shaped portion of the bearing retains the said element is proper position and that the device locks and unlocks very readily and freely on the threaded keyway of the shank and in the finished product the element is plain and presents a very neat appearance and hence the production of this device reduces the cost to a very considerable degree.

Having described my invention, what I claim and desire to secure by Letters-Patent, is:

In a caster, the combination of a shank, a hanger secured thereto, a roller secured to the hanger, a slot provided longitudinally in the threaded portion of the shank, and a bearing threaded on the shank and adapted to move upwardly and downwardly on the shank, a cup shape portion formed on the bearing and an inner flange formed on the lower end of the bearing, an aperture formed in the flange, apertures formed in the cup-shaped portion, and a locking element adapted to seat in the apertures of the cup-shaped portion and also in the aperture of the flange, and having a portion that normally seats in the longitudinal slot of the shank, means for retaining the portion in the slot of the shank.

In testimony whereof I have hereunto set my hand in presence of two subscribing witnesses.

GEORGE F. VAN METER.

Witnesses:
 JOHN F. DREGMAN,
 HAROLD KUEHRMANN.